United States Patent
Mashimo

(10) Patent No.: US 11,017,800 B2
(45) Date of Patent: May 25, 2021

(54) HEAD SHELL

(71) Applicant: Audio-Technica Corporation, Tokyo (JP)

(72) Inventor: Aya Mashimo, Kanagawa (JP)

(73) Assignee: Audio-Technica Corporation, Tokyo (JP)

( * ) Notice: Subject to any disclaimer, the term of this patent is extended or adjusted under 35 U.S.C. 154(b) by 0 days.

(21) Appl. No.: 16/864,546

(22) Filed: May 1, 2020

(65) Prior Publication Data

US 2020/0357428 A1 Nov. 12, 2020

(30) Foreign Application Priority Data

May 7, 2019 (JP) .............................. JP2019-087638

(51) Int. Cl.
*G11B 3/36* (2006.01)

(52) U.S. Cl.
CPC ...................... *G11B 3/36* (2013.01)

(58) Field of Classification Search
None
See application file for complete search history.

(56) References Cited

U.S. PATENT DOCUMENTS

| | | | | |
|---|---|---|---|---|
| 4,029,322 A * | 6/1977 | Maeda | ..................... | G11B 3/42 369/256 |
| 4,276,635 A * | 6/1981 | Obata | ..................... | G11B 3/42 369/256 |
| 4,340,957 A * | 7/1982 | Kuehn | ..................... | G11B 3/46 369/256 |
| 4,382,651 A * | 5/1983 | Klosin | ..................... | H01F 27/40 439/359 |
| 4,490,816 A * | 12/1984 | Kehl | ........................ | G11B 3/06 33/645 |
| 4,495,611 A * | 1/1985 | Suzuki | ..................... | H04R 1/16 369/139 |
| 4,571,717 A * | 2/1986 | Reichel | .................... | G11B 3/42 369/170 |
| 10,614,833 B2 * | 4/2020 | Son | ......................... | G11B 3/38 |

(Continued)

FOREIGN PATENT DOCUMENTS

| | | |
|---|---|---|
| JP | S52 85401 U | 6/1977 |
| JP | S54 8403 U | 1/1979 |

(Continued)

OTHER PUBLICATIONS

Head Shell, User's Manual for AT-LH13/OCC, Audio-Technica Corporation, <https://www.audio-technica.co.jp/items/contents/101/model/AT-LH13_OCC/download/AT-LH13OCC_15_18.pdf>.

*Primary Examiner* — William J Klimowicz
(74) *Attorney, Agent, or Firm* — W & C IP

(57) ABSTRACT

A head shell is attachable to and detachable from a connector of a tone arm of a record player, and holds a pickup cartridge. The head shell includes a cylinder attachable to and detachable from the connector, a head shell main body held to the cylinder, and a fixing screw capable of fixing the head shell main body to the cylinder. The cylinder includes a cylindrical cylinder external circumferential surface and a groove disposed on the cylinder external circumferential surface along an axial direction of the cylinder. A space is defined between the fixing screw and the groove in a circumferential direction of the cylinder.

15 Claims, 9 Drawing Sheets

(56) References Cited

U.S. PATENT DOCUMENTS

2018/0286435 A1* 10/2018 Son .................. G11B 3/38
2020/0043520 A1* 2/2020 Son .................. G11B 3/06

FOREIGN PATENT DOCUMENTS

| JP | S55 15606 U | 1/1980 |
| JP | S56 157017 U | 11/1981 |
| JP | 2017069751 A * | 4/2017 |
| JP | 2018-63741 A | 4/2018 |
| JP | 2018063741 A * | 4/2018 |

* cited by examiner

HEAD SHELL

TECHNICAL FIELD

The present invention relates to a head shell.

BACKGROUND ART

Record players play back sound signals recorded on records by converting oscillation of needles mechanically tracing sound grooves of the records into electrical signals. Needles are attached to pick-up cartridges (hereinafter referred to as "cartridges"). Cartridges are attached to head shells (for example, see Japanese Unexamined Patent Application Publication No. 2018-63741).

Head shells hold cartridges. Head shells are attached to tone arms of record players. Head shells transmit electrical signals from the cartridges to signal lines wired in the tone arms.

A distal end (needle tip) of the needle of each of the cartridges is worn in accordance with the use time of the needle. Therefore, the needle of each of the cartridges is changed for each predetermined use time. In addition, the sound quality of sound (playback sound) played back by the record player differs according to the type of the cartridge. Thus, the cartridge can be changed in accordance with the sound quality desired by a user of the record player. Generally, when the needle and/or the cartridge is changed, the head shell is detached from the tone arm.

When the head shell (in particular, the head shell after the cartridge is changed) is attached to the tone arm, the position of the needle tip with respect to the record is easily shifted from a proper position. The position of the needle tip with respect to the record is regulated by regulating overhang. Overhang is a distance obtained by subtracting a distance between the fulcrum of the tone arm and the rotation center (spindle center) of the record from a distance between the fulcrum of the tone arm and the needle tip. When the overhang is not proper, malfunction, such as tracking errors and degradation in sound quality of the playback sound, easily occurs.

Overhang is regulated by user's moving of the position of the cartridge with respect to the head shell. The cartridge is required to be attached in parallel with the head shell in bottom (plan) view. Therefore, the user regulates the position of the needle tip and inclination of the cartridge with respect to the head shell, in regulation of the overhang.

A head shell that enables regulation of overhang in a state in which the cartridge is attached to the head shell has been proposed (for example, see "User's Manual for AT-LH13/OCC", Audio-Technica Corporation, [online], [Searched on Apr. 11, 2019], Internet <https://www.audio-technica.co.jp/items/contents/101/model/AT-H13/OCC/download/AT-LH13OCC_15_18.pdf>).

The head shell disclosed in "User's Manual for AT-LH13/OCC" includes a cylinder and a head shell main body. The cylinder includes a connector part and a holding part. The connector part is attached to the tone arm. The holding part holds the head shell main body. The holding part is inserted through a through hole disposed in a rear end wall of the head shell main body. The head shell main body is fixed to the holding part with a bolt and a set screw.

In the head shell disclosed in "User's Manual for AT-LH13/OCC", when the bolt and the set screw are unfastened, the head shell main body is movable with respect to the cylinder. Therefore, in the state in which the cylinder is attached to the tone arm, the user can regulate the position of the head shell main body with respect to the cylinder. Accordingly, the overhang of the head shell can be regulated in the state in which the cartridge is attached to the head shell.

However, in the head shell disclosed in "User's Manual for AT-LH13/OCC", the head shell main body is movable in each of the axial direction and the circumferential direction of the cylinder. Therefore, in regulation of overhang, the head shell main body easily rotates in the circumferential direction of the cylinder with respect to the cylinder. Thus, in regulation of overhang, the head shell main body is often attached in an inclined state to the horizontal plane. When the head shell main body is inclined to the horizontal plane, the needle tip does not abut against the sound groove at a proper angle (angle at which the axis of the needle is perpendicular to the record). As a result, malfunction causing damage to the user's possessions (such as breakage of the needle tip and/or damage to the record) may occur, as well as deterioration in sound quality of the playback sound. Accordingly, in the head shell disclosed in "User's Manual for AT-LH13/OCC", regulation of overhang also requires regulation (regulation of levelness) to set the head shell main body in parallel with the horizontal plane.

When levelness is regulated by visual observation, the head shell has no part serving as a clear standard for regulation by visual observation. Therefore, regulation of levelness by visual observation is not easy. Accordingly, regulation of levelness using a level is usually performed among regular users who usually use record players. However, many regular users feel it troublesome to perform regulation of levelness using a level.

In the meantime, with a record boom created in recent years, record players have been used increasingly by beginners (young people) who are not accustomed to use record players, as well as regular users. The regular users sufficiently understand the importance of regulation of overhang described above, and are familiar with the regulation. Therefore, the regular users can regulate overhang to a certain degree. By contrast, the beginners do not sufficiently understand the importance of regulation of overhang, and are unfamiliar with regulation of overhang. Therefore, the beginners have difficulty in thinking of using a level, and few beginners have a level. Specifically, regulation of overhang (in particular, regulation of levelness) is not easy for beginners.

To solve such a problem, in the case where a head shell is provided with a regulation mechanism for regulation of overhang, including regulation of levelness, additional components and/or processing are required. As a result, productivity of the head shell decreases.

An object of the present invention is to provide a head shell that enables easy and accurate regulation of overhang.

Solution to Problem

The head shell according to the present invention is a head shell attachable to and detachable from a connector of a tone arm of a record player and holds a pickup cartridge, and includes: a cylinder attachable to and detachable from the connector; a head shell main body held to the cylinder; and a fixing screw capable of fixing the head shell main body to the cylinder. The cylinder includes a cylindrical cylinder external circumferential surface and a groove disposed on the cylinder external circumferential surface along an axial direction of the cylinder. A space is defined between the fixing screw and the groove in a circumferential direction of the cylinder.

Advantageous Effects of Invention

According to the present invention, regulation of overhang can be performed easily and accurately.

DESCRIPTION OF EMBODIMENTS

Embodiments of a head shell according to the present invention will now be described with reference to the attached drawings.

Head Shell

Figure 1:
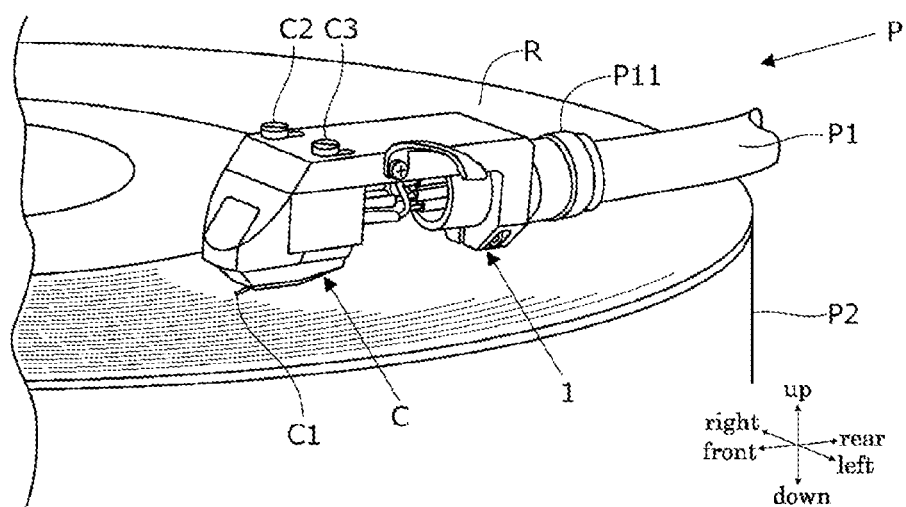
FIG. 1 is a perspective view illustrating an usage example of a head shell according to the present invention.

FIG. 1 is a perspective view illustrating an usage example of a head shell according to the present invention.

FIG. 1 illustrates a head shell 1, a pickup cartridge (hereinafter referred to as "cartridge") C, a tone arm P1 and a turntable P2 of a record player P, and a record R placed on the turntable P2.

The cartridge C includes a needle C1 that traces the sound groove of the record R. The cartridge C converts oscillation of the needle C1 generated by tracing the sound groove with the needle C1 into an electrical signal. The tone arm P1 supports the cartridge C via the head shell 1, and applies certain pressure (needle pressure) to the needle C1. The tone arm P1 includes a connector P11. The connector P11 is disposed at a distal end of the tone arm P1. The head shell 1 is attached to the connector P11. The turntable P2 rotates the record R at certain speed.

The head shell 1 holds the cartridge C. In other words, the head shell 1 is an adaptor to attach the cartridge C to the tone arm P1. The cartridge C is attached to (held to) the head shell 1 with attachment screws C2 and C3. The head shell 1 is attached to the connector P11 of the tone arm P1 of the record player P.

In the following explanation, the term "rear" indicates a direction in which the connector P11 is positioned with respect to the head shell 1 attached to the tone arm P1. The term "front" indicates a direction in which the cartridge C held to the head shell 1 is positioned with respect to the connector P11 to which the head shell 1 is attached. The term "downward (under)" indicates a direction in which the record R is positioned with respect to the head shell 1 when the needle C1 traces the sound groove of the record R. The term "upward (above)" indicates a direction in which the head shell 1 is lifted when the user separates the needle C1 from the record R.

Structure of Head Shell

Figure 2:
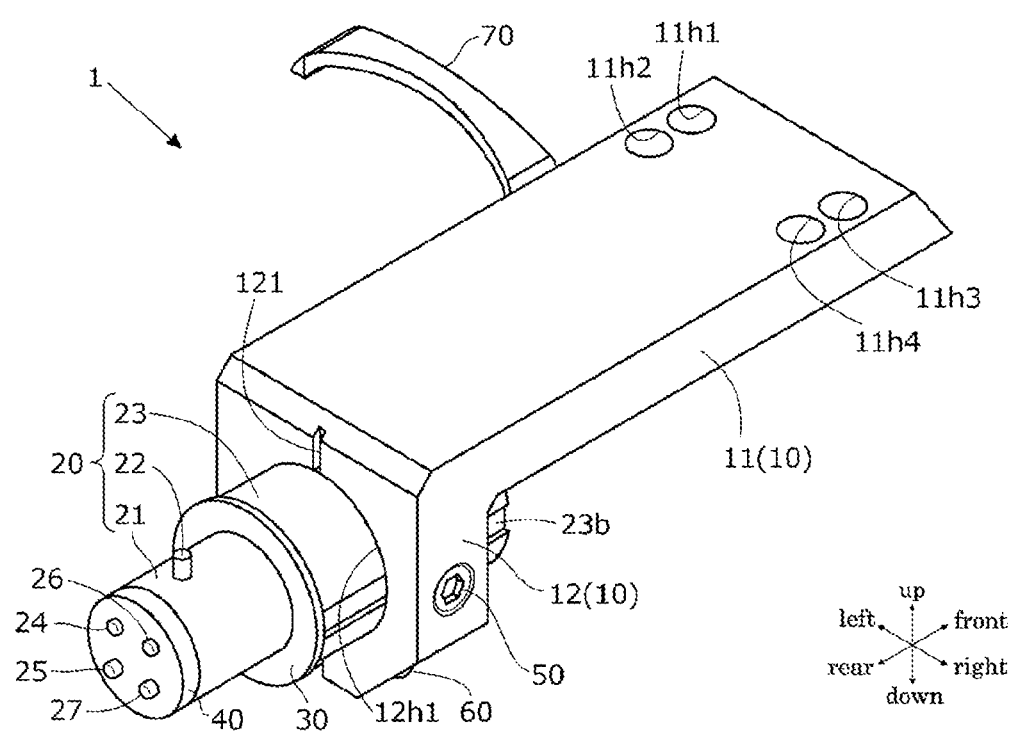
FIG. 2 is a perspective view illustrating an embodiment of the head shell of FIG. 1.

FIG. 2 is a perspective view illustrating an embodiment of the head shell 1.

Figure 3:
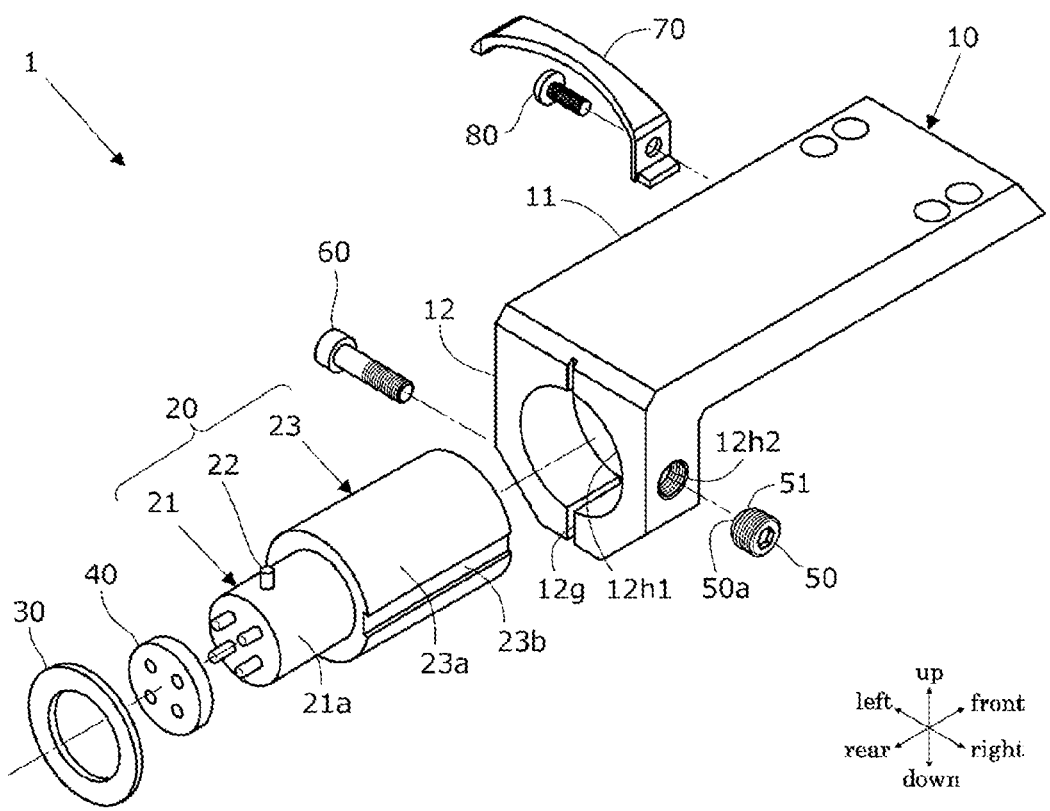
FIG. 3 is an exploded perspective view of the head shell of FIG. 2.

FIG. 3 is an exploded perspective view of the head shell 1.

The head shell 1 includes a head shell main body 10, a cylinder 20, a buffer member 30, an insulating member 40, a first fixing screw 50, a second fixing screw 60, a finger 70, and a finger attachment screw 80.

The head shell main body 10 holds the cartridge C (see FIG. 1). The head shell main body 10 has an L shape in side view. The head shell main body 10 is made of metal, such as aluminum. The head shell main body 10 includes a first holding part 11 and a second holding part 12.

The first holding part 11 holds the cartridge C (see FIG. 1). The first holding part 11 has a rectangular and plate-like shape that is long in the front-rear direction. The first holding part 11 includes four screw insertion holes $11h1$, $11h2$, $11h3$ and $11h4$, and a cylinder guide groove 111 (see FIG. 5).

The screw insertion holes $11h1$ to $11h4$ are through holes through which the attachment screws C2 and C3 (see FIG. 1) are inserted. The screw insertion holes $11h1$ to $11h4$ are disposed in a front part of the first holding part 11.

Figure 4:
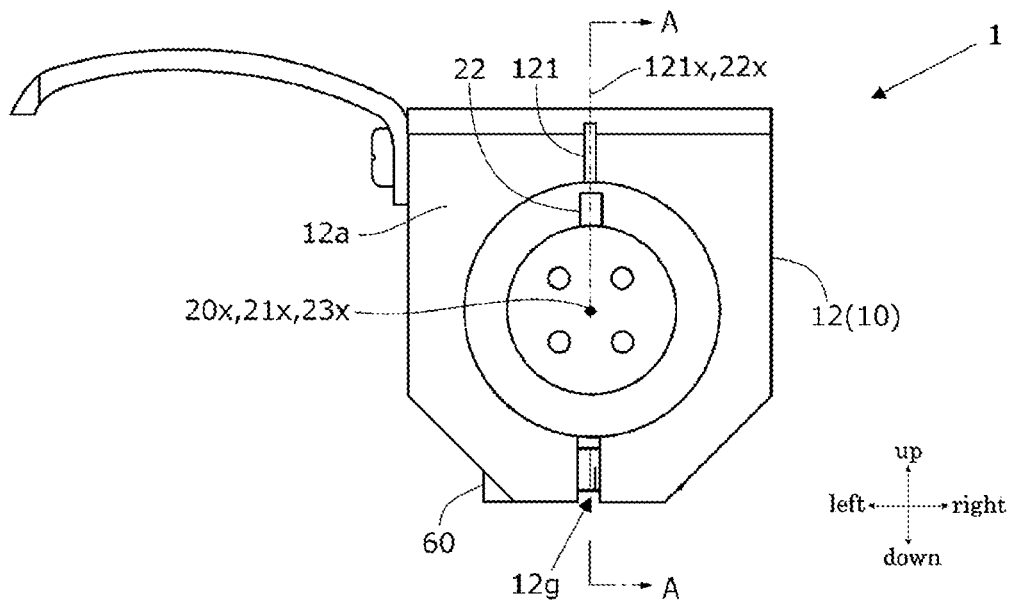
FIG. 4 is a back view of the head shell of FIG. 2.

FIG. 4 is a back view of the head shell 1.

Figure 5:
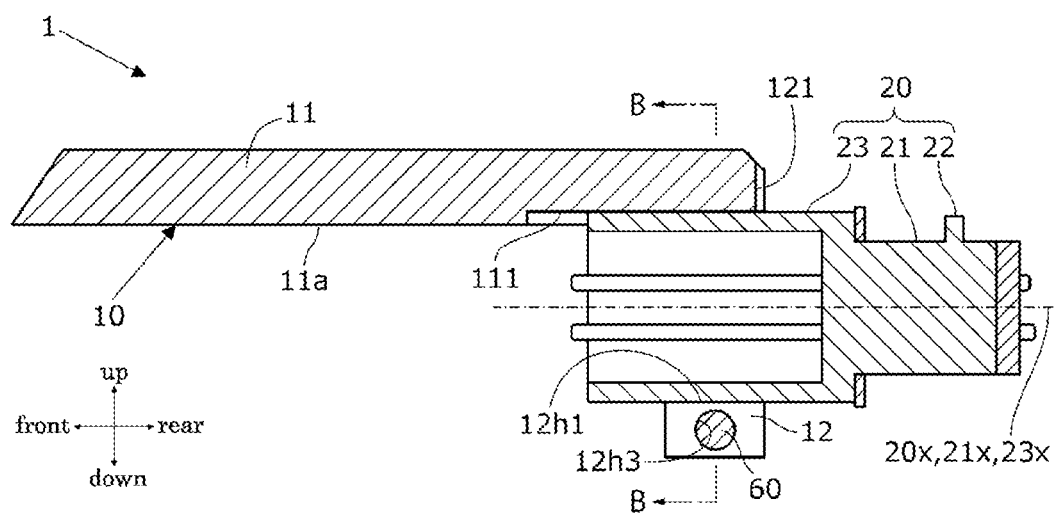
FIG. 5 is a cross-sectional view of the head shell of FIG. 2, taken along line A-A of FIG. 4.

FIG. 5 is a cross-sectional view of the head shell 1, taken along line A-A of FIG. 4.

Figure 6:
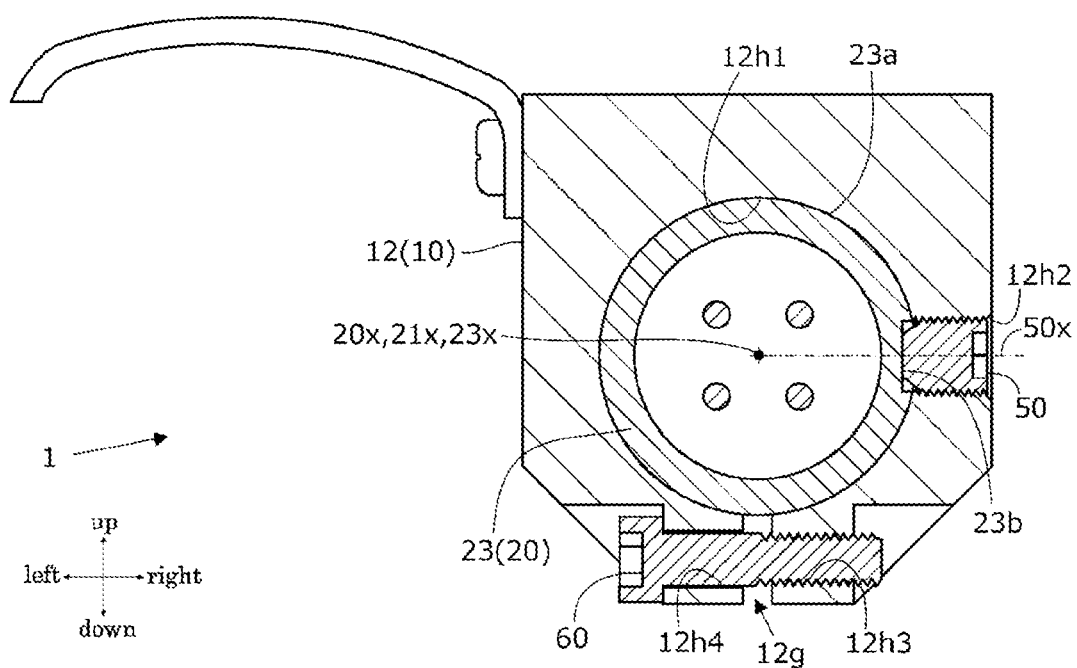
FIG. 6 is a cross-sectional view of the head shell of FIG. 2, taken along line B-B of FIG. 5.

FIG. 6 is a cross-sectional view of the head shell 1, taken along line B-B of FIG. 5.

The cylinder guide groove 111 guides movement of the below-mentioned cylinder 20 in the front-rear direction. An internal surface of the cylinder guide groove 111 has an arc shape in the cross-sectional view illustrated in FIG. 5. The internal surface extends along an external circumferential surface (the below-mentioned external circumferential surface $23a$ of a main body holding part 23) of the cylinder 20. The cylinder guide groove 111 is disposed on a lower surface $11a$ in a rear part of the first holding part 11. The cylinder guide groove 111 communicates with the below-mentioned insertion hole $12h1$.

The second holding part 12 is held to the cylinder 20. The second holding part 12 has a plate-like shape extending along a up-down direction. The second holding part 12 is disposed at a rear end of the first holding part 11 to stand straight downward from the first holding part 11. The second holding part 12 is integrated with the first holding part 11. The second holding part 12 includes an insertion hole $12h1$, a first screw hole $12h2$, a second screw hole $12h3$, a screw insertion hole $12h4$, a slit $12g$, and a regulating groove 121.

It should be noted that second holding part may be formed separately from the first holding part. Specifically, for example, the second holding part may be coupled to the first holding part with a coupling member, such as a screw.

The insertion hole $12h1$ is a through hole through which the cylinder 20 is inserted (holding the cylinder 20). The insertion hole $12h1$ has a circular shape in back view. The insertion hole $12h1$ is disposed in the center of the second holding part 12. The insertion hole $12h1$ penetrates the second holding part 12 in the front-rear direction (right-left direction on the paper in FIG. 5). An internal circumferential surface in an upper part of the insertion hole $12h1$ is integrally formed with the cylinder guide groove 111.

The first screw hole $12h2$ is a through hole into which the first fixing screw 50 is screwed. The first screw hole $12h2$ is disposed in substantially the center of a right side surface of the second holding part 12. The first screw hole 12$h$2 communicates with the insertion hole 12$h$1.

The second screw hole 12$h$3 is a through hole into which the second fixing screw 60 is screwed. The second screw hole 12$h$3 is disposed under the insertion hole 12$h$1 and in the right side surface of the second holding part 12.

The screw insertion hole 12$h$4 is a through hole through which the second fixing screw 60 is inserted. The screw insertion hole 12$h$4 is disposed under the insertion hole 12$h$1 and in a left side surface of the second holding part 12. The screw insertion hole 12$h$4 is disposed coaxially with the second screw hole 12$h$3.

The slit 12$g$ is a gap of which an interval varies according to fastening of the second fixing screw 60. The slit 12$g$ is disposed in the center of the second holding part 12 in the right-left direction, and in a lower end part of the second holding part 12. The slit 12$g$ penetrates the second holding part 12 in the front-rear direction, and communicates with the insertion hole 12$h$1. The slit 12$g$ is positioned between the second screw hole 12$h$3 and the screw insertion hole 12$h$4. In the second holding part 12, parts located on the left and the right of the slit 12$g$ are thin parts having a small thickness in the right-left direction.

The regulating groove 121 assists regulation of the levelness of the head shell main body 10, in the below-mentioned regulation of overhang. The regulating groove 121 is a long groove. The regulating groove 121 is disposed on the center of a rear surface 12$a$ of the second holding part 12 in the right-left direction, and above the insertion hole 12$h$1. The regulating groove 121 extends upward from the insertion hole 12$h$1 side. The regulating groove 121 serves as a second sign (recessed part) in the present invention. The rear surface 12$a$ serves as a back surface in the present invention. Regulation of levelness with the regulating groove 121 will be described later.

Referring now back to FIG. 1 to FIG. 5, the cylinder 20 holds the head shell main body 10. The cylinder 20 is made of metal, such as aluminum. The cylinder 20 is inserted through the insertion hole 12$h$1 and holds the head shell main body 10. The cylinder 20 includes a connector part 21, a projection part 22, a main body holding part 23, and four terminal pins 24, 25, 26 and 27.

The connector part 21 mechanically connects the head shell 1 with the tone arm P1, and electrically connects the terminal pins 24 to 27 with a signal line of the tone arm P1. The connector part 21 has a columnar shape, and includes a cylindrical external circumferential surface 21$a$. The external circumferential surface 21$a$ serves as a connector external circumferential surface in the present invention. The connector part 21 is attached to the connector P11.

The projection part 22 fixes the connector part 21 to the connector P11. The projection part 22 has a columnar shape. A part of the external circumferential surface 21$a$ projects from the external circumferential surface 21$a$ in the radial direction of the connector part 21 and thereby the projection part 22 is formed. The projection part 22 is disposed on the upper surface (upper end surface) of the external circumferential surface 21$a$ along the up-down direction. The projection part 22 serves as the first sign in the present invention.

The connector part 21 is attached to the connector P11 by a Bayonet attachment method in the same manner as Bayonet Neill Concelman (BNC) connectors. Specifically, by arrival of the projection part 22 at the end of a lock groove (not shown) of the connector P11, the connector part 21 is attached to the connector P11. By contrast, by separation of the projection part 22 from the lock groove, the connector part 21 is detached from the connector P11. Specifically, the projection part 22 can fix the connector part 21 to the connector P11, and the connector part 21 is attachable to and detachable from the connector P11.

The main body holding part 23 is inserted through the insertion hole 12$h$1, and holds the head shell main body 10. The main body holding part 23 functions as the movement axis and the rotation axis of the head shell main body 10, in the below-described regulation of overhang. The main body holding part 23 has a bottomed cylindrical shape having an opening at a front end. The main body holding part 23 serves as the holding part in the present invention. The main body holding part 23 includes a cylindrical external circumferential surface 23$a$ and a screw guide groove 23$b$. The external circumferential surface 23$a$ serves as the cylinder external circumferential surface in the present invention.

The external diameter of the main body holding part 23 is larger than the external diameter of the connector part 21. The main body holding part 23 is disposed in front of the connector part 21 and integrally formed with the connector part 21. In back view, the center position of the main body holding part 23 in the radial direction is the same as the center position of the connector part 21 in the radial direction. Specifically, a central axis 20$x$ of the cylinder 20 is superimposed on a central axis 21$x$ of the connector part 21 and a central axis 23$x$ of the main body holding part 23. Each of the central axes 20$x$, 21$x$, and 23$x$ is parallel with the front-rear direction (right-left direction on the paper in FIG. 5). Accordingly, the axial direction of the cylinder 20 (the connector part 21 and the main body holding part 23) is the front-rear direction.

Figure 7:
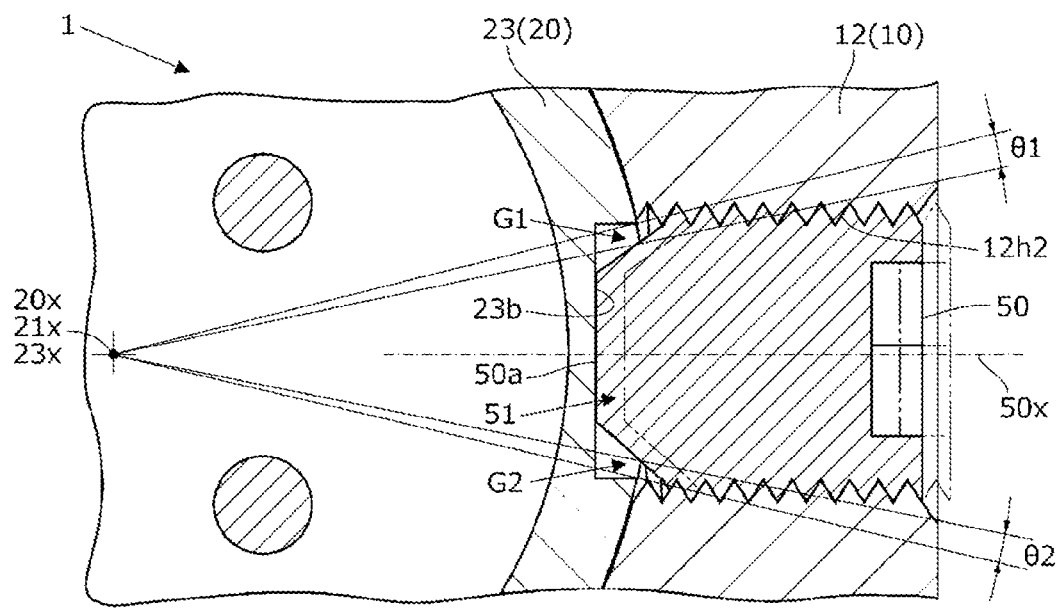
FIG. 7 is an enlarged cross-sectional view obtained by enlarging a part of the head shell of FIG. 6.

FIG. 7 is an enlarged cross-sectional view obtained by enlarging a part of FIG. 6.

Figure 8:
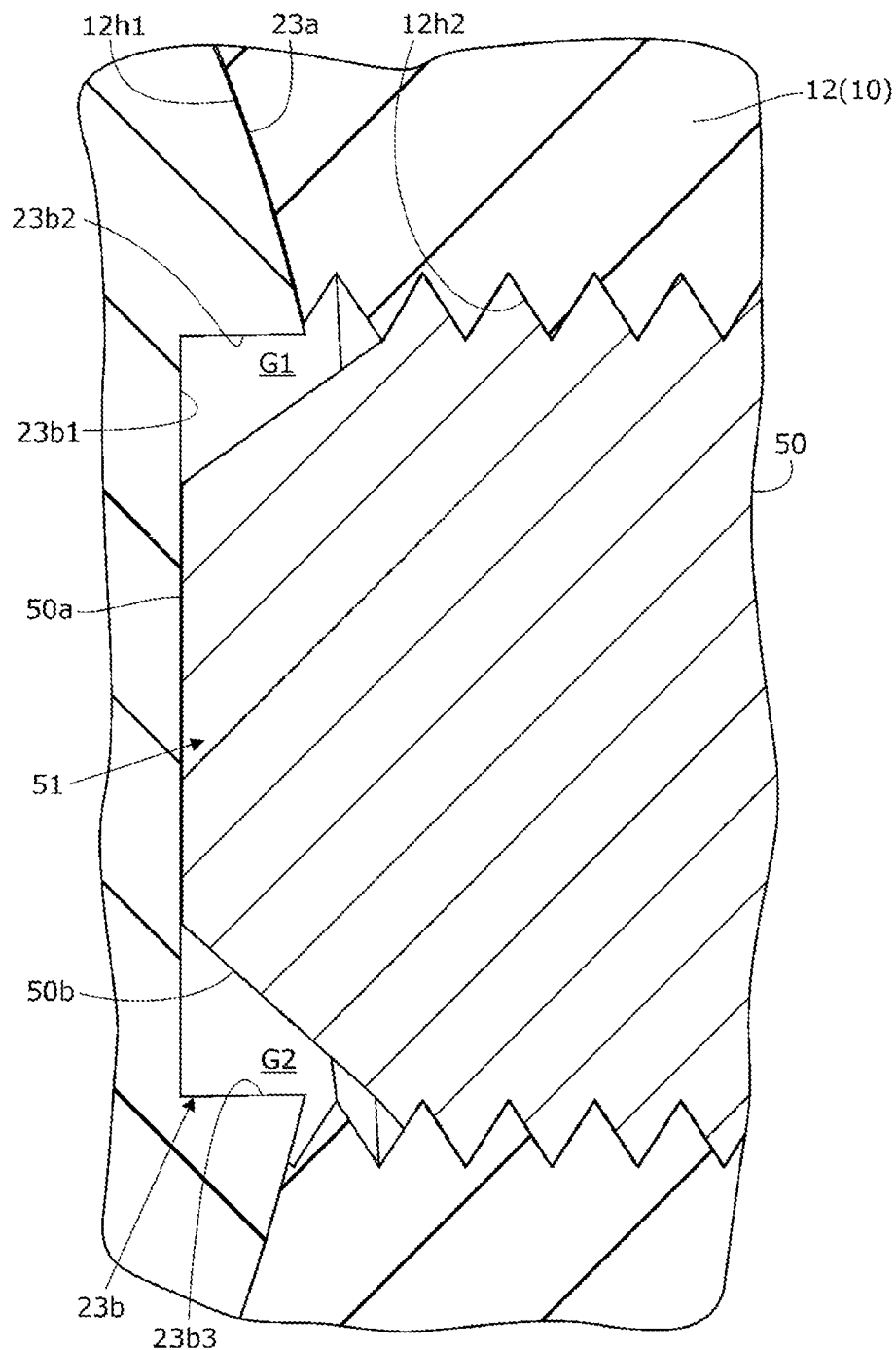
FIG. 8 is an enlarged cross-sectional view obtained by further enlarging a part of the head shell of FIG. 7.

FIG. 8 is an enlarged cross-sectional view obtained by further enlarging a part of FIG. 7.

FIG. 7 illustrates a state in which the first fixing screw 50 is unfastened with a two-dot chain line.

The screw guide groove 23$b$ guides the below-described distal end part 51 of the first fixing screw 50 in the front-rear direction, and restricts movement (rotation) of the distal end part 51 in the circumferential direction of the cylinder 20. The screw guide groove 23$b$ serves as the groove in the present invention. As illustrated in FIG. 3, the screw guide groove 23$b$ is disposed on a right side surface of the external circumferential surface 23$a$. In the external circumferential surface 23$a$, the right side surface is a surface facing the center side of the record R when the needle C1 (see FIG. 1) traces the sound groove of the record R (see FIG. 1). The screw guide groove 23$b$ extends from a front end to a rear end of the main body holding part 23 along the axial direction (front-rear direction) of the cylinder 20. The screw guide groove 23$b$ includes a bottom surface 23$b$1, an upper side surface 23$b$2 disposed at an upper end of the bottom surface 23$b$1, and a lower side surface 23$b$3 disposed at a lower end of the bottom surface 23$b$1.

Referring now back to FIG. 1 to FIG. 6, the terminal pins 24 to 27 transmit an electrical signal from the cartridge C to the signal line (not shown) of the tone arm P1. The signal line is wired inside the tone arm P1. The terminal pins 24 to 27 are made of metal having excellent conductivity, such as copper. The terminal pins 24 to 27 penetrate the connector part 21 and the insulating member 40 in the front-rear direction, and are fixed to the connector part 21. The terminal pins 24 to 27 are connected with a terminal (not shown) of the connector P11, when the connector part 21 is attached to the connector P11. The electrical signal from the cartridge C is transmitted to the signal line of the tone arm P1 via the terminal pins 24 to 27 and the terminal.

The cylinder 20 is inserted through the insertion hole 12$h$1 from the rear, and penetrates the rear surface 12$a$ (second holding part 12). In this state, the substantial center part of the main body holding part 23 in the front-rear direction is disposed in the insertion hole 12$h$1. As a result, the head shell main body 10 is held with the cylinder 20. A front upper part of the main body holding part 23 is disposed in the cylinder guide groove 111. The bottom surface 23$b$1 (see FIG. 8) of the screw guide groove 23$b$ is opposed to the first screw groove 12$h$2. A rear part of the main body holding part 23 projects rearward from the second holding part 12. The connector part 21 is disposed in the rear of the second holding part 12. The projection part 22 is disposed in the rear of the second holding part 12 and apart from the second holding part 12.

In the following explanation, the term "axial direction" indicates the axial direction (front-rear direction) of the cylinder 20, unless otherwise described. The term "axial view" indicates an axial view (front view or back view) of the cylinder 20, unless otherwise described. The term "circumferential direction" indicates the circumferential direction of the cylinder 20, unless otherwise described. The term "radial direction" indicates the radial direction of the cylinder 20, unless otherwise described.

The projection part 22 is disposed under the regulating groove 121 in axial view. When the regulating groove 121 is disposed along the up-down direction, the projection part 22 and the regulating groove 121 are disposed in line in the radial direction of the cylinder 20 in axial view. In this state, a center line 121$x$ of the regulating groove 121 is superimposed on a central axis 22$x$ of the projection part 22 in axial view. The center line 121$x$ is a straight line passing through the center of the regulating groove 121 in the right-left direction in axial view. The center line 121$x$ and the central axis 22$x$ are orthogonal to the central axis 20$x$. Specifically, the regulating groove 121 is disposed on the rear surface 12$a$ along the radial direction in axial view. Therefore, the user can regulate the position of the head shell main body 10 in the circumferential position with respect to the cylinder 20 by checking the position of the regulating groove 121 with respect to the projection part 22 by visual observation, when the user rotates the head shell main body 10 in the circumferential direction with respect to the cylinder 20. As described above, the regulating groove 121 and the projection part 22 function as a regulation assistance mechanism assisting regulation of the position of the head shell main body 10 in the circumferential position with respect to the cylinder 20.

The buffer member 30 protects each of the connector P11 and the cylinder 20 (the rear surface of the main body holding part 23), when the connector part 21 is attached to the connector P11 (see FIG. 1). The buffer member 30 is made of synthetic resin, such as rubber, and has a ring-shape and a plate-like shape. The buffer member 30 is attached to the external circumferential surface 21$a$ positioned at the front end of the connector part 21, and abuts against the rear surface of the main body holding part 23.

The insulating member 40 insulates spaces between the terminal pins 24 to 27. The insulating member 40 is made of, for example, synthetic resin, and has a disk-like shape. The insulating member 40 is attached to the rear surface of the connector part 21.

Referring now back to FIG. 6 to FIG. 8, the first fixing screw 50 fixes the head shell main body 10 to the cylinder 20, and restricts movement (rotation) of the head shell main body 10 in the circumferential direction. The first fixing screw 50 is a head flat point set screw, and includes a distal end surface 50$a$ having a flat shape. The first fixing screw 50 is made of, for example, stainless steel.

The external circumferential surface of the distal end of the first fixing screw 50 is a chamfered surface 50$b$ that is chamfered. The first fixing screw 50 is screwed into the first screw hole 12$h$2 of the second holding part 12. The distal end of the first fixing screw 50 projects from the first screw hole 12$h$2 into the insertion hole 12$h$1, and is disposed in the screw guide groove 23$b$. A central axis 50$x$ of the first fixing screw 50 is orthogonal to the central axis 20$x$.

In the first fixing screw 50, a part (hereinafter referred to as "distal end part 51") disposed in the screw guide groove 23$b$ serves as the distal end part in the present invention. Specifically, the first fixing screw 50 includes a distal end part 51. In the present embodiment, the distal end part 51 includes the distal end surface 50$a$ and the chamfered surface 50$b$.

In the circumferential direction, spaces G1 and G2 are defined between the distal end part 51 and the screw guide groove 23$b$. The space G1 is defined between the distal end part 51 and the upper side surface 23$b$2. The space G2 is defined between the distal end part 51 and the lower side surface 23$b$3.

When the first fixing screw 50 is fastened, the distal end surface 50$a$ of the first fixing screw 50 abuts against the bottom surface 23$b$1 of the screw guide groove 23$b$. Specifically, the first fixing screw 50 can abut against the bottom surface 23$b$1 of the screw guide groove 23$b$. In this state, the head shell main body 10 is fixed to the cylinder 20 with the first fixing screw 50. When the distal end surface 50$a$ abuts against the bottom surface 23$b$1, the circumferential length of each of the spaces G1 and G2 is shortest. By contrast, when the first fixing screw 50 is unfastened, the distal end surface 50$a$ is separated from the bottom surface 23$b$1. As a result, fixing of the head shell main body 10 to the cylinder 20 with the first fixing screw 50 is released. As described above, the first fixing screw 50 can fix the head shell main body 10 to the cylinder 20. In other words, the first fixing screw 50 can fix the cylinder 20 to the head shell main body 10.

The second fixing screw 60 changes the interval of the slit 12$g$. The second fixing screw 60 is, for example, a bolt including a head part, and made of, for example, a stainless steel. The second fixing screw 60 is inserted through the screw insertion hole 12$h$4 of the second holding part 12, and screwed into the third screw hole 12$h$3.

When the second fixing screw 60 is fastened, the interval of the slit 12$g$ is narrowed. Accordingly, the insertion hole 12$h$1 is slightly deformed toward the inside of the insertion hole 12$h$1 (the diameter of the insertion hole 12$h$1 is reduced). In this state, the force (hereinafter referred to as "fastening force") with which the insertion hole 12$h$1 fastens the cylinder 20 increases. As a result, the head shell main body 10 is fixed to the cylinder 20. By contrast, when the second fixing screw 60 is unfastened, the interval of the slit 12$g$ is widened, and returns to the original interval. As a result, the insertion hole 12$h$1 returns to the state before the deformation. In this state, the fastening force decreases. As a result, fixing of the head shell main body 10 to the cylinder 20 is released.

Referring now back to FIG. 1 to FIG. 3, the finger 70 is a component under which the user's finger is hooked to lift and move the needle C1 from the record R. The finger 70 is attached to a left side surface of the head shell main body 10 with the finger attachment screw 80.

Relation Between Head Shell Main Body and Cylinder

Relation between the head shell main body 10 and the cylinder 20 will now be described with reference to FIG. 5 to FIG. 8.

As described above, each of the first fixing screw 50 and the second fixing screw 60 is unfastened, fixing of the head shell main body 10 to the cylinder 20 is released.

The cylinder 20 is rotatable in the circumferential direction with respect to the head shell main body 10 along the insertion hole 12h1 and the cylinder guide groove 111. In this state, the cylinder 20 is rotated around the central axis 20x along the insertion hole 12h1 and the cylinder guide groove 111.

By contrast, the head shell main body 10 is rotatable in the circumferential direction with respect to the cylinder 20 along the external circumferential surface 23a. In this state, the head shell main body 10 is rotated around the cylinder 20 serving as the rotation axis, along the external circumferential surface 23a. The range of rotation of the head shell main body 10 is restricted by abutment of the distal end part 51 against the screw guide groove 23b. Specifically, the head shell main body 10 is rotatable counterclockwise in back view until the distal end part 51 abuts against the upper side surface 23b2. That is, the head shell main body 10 is rotatable only within the angle range of an angle θ1 corresponding to the circumferential length of the space G1. By contrast, the head shell main body 10 is rotatable clockwise in back view until the distal end part 51 abuts against the lower side surface 23b3. Specifically, the head shell main body 10 is rotatable only within the angle range of an angle θ2 corresponding to the circumferential length of the space G2. In the present embodiment, the head shell main body 10 is rotatable only within each of angle ranges of approximately 2° in the clockwise direction and the counterclockwise direction.

In addition, the cylinder 20 is movable (slidable) in the axial direction (front-rear direction) with respect to the head shell main body 10 along the insertion hole 12h1 and the cylinder guide groove 111.

By contrast, the head shell main body 10 is movable (slidable) in the axial direction with respect to the cylinder 20 along the main body holding part 23 of the cylinder 20. In this state, the distal end part 51 is guided to the screw guide groove 23b and moves in the axial direction. As described above, when the head shell main body 10 is rotated in the circumferential direction, the distal end part 51 abuts against the screw guide groove 23b. Therefore, the distal end part 51 is movable in the screw guide groove 23b only in substantially the axial direction. Specifically, the head shell main body 10 is movable only in substantially the axial direction with respect to the cylinder 20.

The head shell main body 10 is fixed to the cylinder 20, when one of the first fixing screw 50 and the second fixing screw 60 is fastened.

Method for Regulating Overhang

A method for regulating overhang in attachment of the cartridge C to the head shell 1 will now be described also with reference to FIG. 1 to FIG. 4. The method for regulating overhang includes regulation of the position of the distal end (needle tip) of the needle C1 of the cartridge C and regulation of levelness of the head shell main body 10. Overhang is regulated by the user of the record player P.

Figure 9:
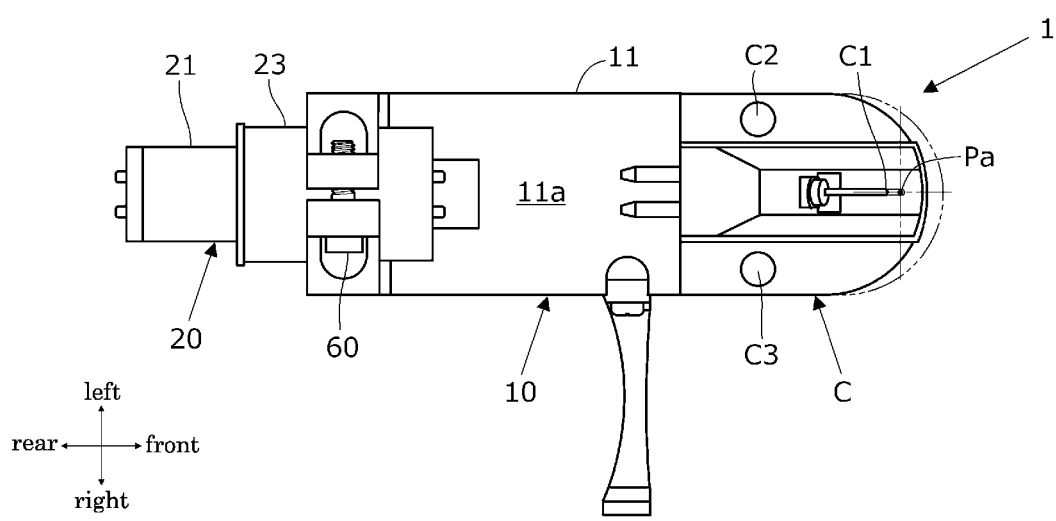
FIG. 9 is a bottom view of the head shell of FIG. 2 to which a pickup cartridge is attached.

FIG. 9 is a bottom view of the head shell 1 to which the cartridge C is attached.

First, the user attaches the cartridge C to the lower surface 11a of the first holding part 11 of the head shell 1 using the attachment screws C2 and C3. At this stage, the cartridge C is positioned with respect to the head shell 1 such that the side surfaces of the cartridge C are parallel with the side surfaces of the first holding part 11 in bottom view.

Then, the user attaches the head shell 1 to the connector P11 of the tone arm P1. At this stage, the connector part 21 is fixed to the connector P11 with the projection part 22 and the lock groove of the connector P11. The rear surface 12a faces the tone arm P1 side.

Then, the user unfastens the first fixing screw 50 and the second fixing screw 60. As a result, fixing of the head shell main body 10 to the cylinder 20 is released. Accordingly, the head shell main body 10 becomes movable in the axial direction with respect to the cylinder 20. In addition, the head shell main body 10 becomes rotatable around the cylinder 20 serving as the rotation axis, in the angle range corresponding to the spaces G1 and G2 (see FIG. 8) in the circumferential direction. Specifically, the regulating groove 121 becomes movable (rotatable) with respect to the projection part 22.

Then, the user moves the head shell main body 10 in the front-rear direction to set the position of the needle tip of the needle C1 of cartridge C to a proper position Pa. As a result, the position of the needle tip is regulated to the proper position Pa.

In the example illustrated in FIG. 9, by the user's moving of the head shell main body 10 forward, the position of the needle tip is regulated to the proper position Pa. In this state, the head shell main body 10 is movable freely in the axial direction by guiding of the distal end part 51 to the screw guide groove 23b. By contrast, the head shell main body 10 is rotatable in the circumferential direction until the distal end part 51 abuts against the screw guide groove 23b (the upper side surface 23b2, the lower side surface 23b3: see FIG. 8). Therefore, when the user moves the head shell main body 10, the head shell main body 10 is not rotated largely with respect to the cylinder 20. As a result, the levelness of the head shell main body 10 is not changed greatly.

Then, the user fastens the first fixing screw 50 and the second fixing screw 60. As a result, the head shell main body 10 is fixed to the cylinder 20.

Then, the user detaches the head shell 1 from the connector P11 of the tone arm P1.

Then, the user unfastens the first fixing screw 50, and slightly unfastens the second fixing screw 60. In this state, the insertion hole 12h1 holds the cylinder 20 (main body holding part 23) with predetermined fastening force. When the user applies force exceeding the fastening force to the head shell main body 10, the head shell main body 10 becomes movable with respect to the cylinder 20. In other words, the head shell main body 10 does not move with respect to the cylinder 20 unless the user applies force exceeding the fastening force to the head shell main body 10.

Figure 10:
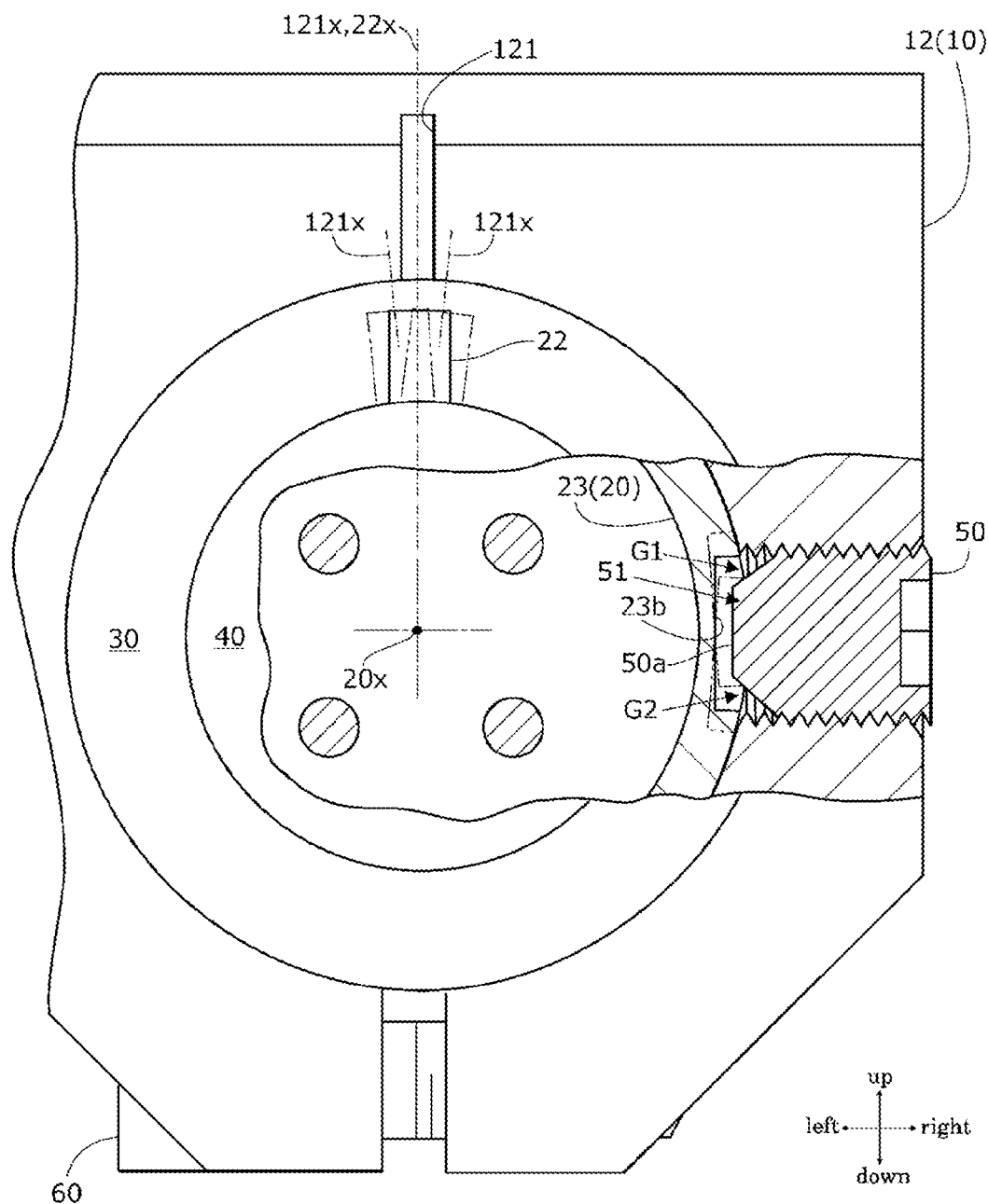
FIG. 10 is an enlarged back view obtained by enlarging a part of the head shell of FIG. 4.

FIG. 10 is an enlarged back view obtained by partly enlarging the head shell 1.

FIG. 10 illustrates the state in which each of the head shell main body 10, the cylinder 20, the buffer member 30, the insulating member 40, and the first fixing screw 50 is partly cut out. FIG. 10 also illustrates the state in which each of the head shell main body 10, the cylinder 20, and the first fixing screw 50 is cut along line B-B of FIG. 5. FIG. 10 also illustrates the projection part 22 and the screw guide groove 23b with two-dot chain lines when the head shell main body 10 is rotated to the maximum with respect to the cylinder 20.

Then, the user regulates the levelness of the head shell main body 10. The levelness of the head shell main body 10 is regulated using the regulating groove 121 and the projection part 22.

Then, the user rotates the head shell main body 10, by using the position of the projection part 22 with respect to the regulating groove 121 as a criterion. Specifically, the user rotates the head shell main body 10 while viewing the regulating groove 121 and the projection part 22 such that the regulating groove 121 and the projection part 22 are disposed in line in the radial direction (such that the center line 121x of the regulating groove 121 is superimposed on the central axis 22x of the projection part 22). As a result, the levelness of the head shell main body 10 is approximately regulated.

Then, the user fastens the first fixing screw 50 and the second fixing screw 60.

Then, the user attaches the head shell 1 to the connector P11 of the tone arm P1. As a result, regulation of overhang by the user is completed.

As described above, the user can regulate the position of the needle tip without largely varying the levelness in regulation of overhang. In addition, the user can approximately regulate the levelness of the head shell main body 10 by visual observation.

CONCLUSION

In the embodiment described above, the head shell 1 includes the cylinder 20 attachable to and detachable from the connector P11, the head shell main body 10 held to the cylinder 20, and the first fixing screw 50 capable of fixing the head shell main body 10 to the cylinder 20. The main body holding part 23 of the cylinder 20 includes the screw guide groove 23b disposed on the external circumferential surface 23a along the axial direction. A part (distal end part 51) of the first fixing screw 50 is disposed inside the screw guide groove 23b. In the circumferential direction, spaces G1 and G2 are defined between the first fixing screw 50 and the screw guide groove 23b.

With this configuration, movement of the first fixing screw 50 in the circumferential direction is restricted to the inside of the screw guide groove 23b. Therefore, the head shell main body 10 is rotatable in the circumferential direction with respect to the cylinder 20 only in the angle range corresponding to the spaces G1 and G2. By contrast, the head shell main body 10 is slidable in the axial direction (front-rear direction) with respect to the cylinder 20 by guiding of the first fixing screw 50 to the screw guide groove 23b. Specifically, the head shell main body 10 is movable only in substantially the axial direction without rotating in the circumferential direction in a large angle range with respect to the cylinder 20. As a result, the user can regulate the position of the needle tip without largely varying the levelness in regulation of overhang. As described above, the head shell 1 enables easy and accurate regulation of overhang, in comparison with the conventional head shell.

In addition, the conventional head shell has no groove corresponding to the screw guide groove 23b in the external circumferential surface of the cylinder. By contrast, the head shell 1 has a structure of adding (forming) the screw guide groove 23b to the external circumferential surface of the cylinder of the conventional head shell. As a result, the head shell 1 facilitates movement of the head shell main body 10 in the axial direction while restricting rotation of the head shell main body 10 in the circumferential direction. Specifically, the head shell 1 enables easy regulation of overhang, only by formation of the screw guide groove 23b corresponding to the first fixing screw 50 in the conventional head shell. Specifically, the head shell 1 requires no addition of components that may cause unnecessary oscillation. As a result, the productivity of the head shell 1 hardly decreases in comparison with the conventional head shell.

In addition, according to the embodiment described above, the distal end surface 50a of the first fixing screw 50 can abut against the bottom surface 23b1 of the screw guide groove 23b when the first fixing screw 50 is fastened. When the distal end surface 50a abuts against the bottom surface 23b1, the spaces G1 and G2 are still defined. Therefore, when the first fixing screw 50 is fastened, the head shell main body 10 is fixed to the cylinder 20 with the first fixing screw 50 without receiving force in the circumferential direction from the first fixing screw 50.

In addition, according to the embodiment described above, the distal end part 51 of the first fixing screw 50 is disposed inside the screw guide groove 23b. The distal end part 51 includes the chamfered surface 50b. Generally, the size (diameter) of the distal end of the screw is not standardized, and tolerance of the size of the distal end is large due to existence of an incomplete thread part or the like. Therefore, the size of the spaces varies in screws having no chamfered surfaces. However, when the chamfered surface 50b is formed in the distal end part 51, a conical surface including no incomplete thread part is formed on the distal end surface 50a side of the distal end part 51. Therefore, variation in size of the spaces G1 and G2 is reduced in the first fixing screw 50 having the chamfered surface 50b, in comparison with screws including no chamfered surfaces.

In addition, according to the embodiment described above, the head shell 1 includes a regulation assistance mechanism assisting regulation of the position of the head shell main body 10 in the circumferential position with respect to the cylinder 20. Therefore, the user can easily regulate the position (levelness of the head shell main body 10) of the head shell main body 10 in the circumferential position with respect to the cylinder 20 by checking the regulation assistance mechanism by visual observation. That is, the head shell 1 enables easy regulation of overhang in comparison with the conventional head shell.

In addition, according to the embodiment described above, the regulation assistant mechanism includes a first sign (projection part 22) and a second sign (regulating groove 121). The cylinder 20 includes the first sign, and the head shell main body 10 includes the second sign. The second sign is movable with respect to the first sign. Therefore, the user can easily regulate the levelness of the head shell 1 by checking the position of the second sign with respect to the first sign by visual observation.

In addition, according to the embodiment described above, the first sign and the second sign can be disposed in line in the radial direction of the cylinder 20. Therefore, the user can easily regulate the levelness of the head shell main body 10 by rotating the head shell main body 10 such that the first sign and the second sign are aligned in the radial direction by visual observation.

In addition, according to the embodiment described above, the projection part 22 used for connection of the connector P11 with the connector part 21 functions as the first sign. Therefore, the head shell 1 enables regulation of the levelness of the head shell main body 10 by user's visual observation, without addition of components that may cause unnecessary oscillation to the conventional head shell.

In addition, according to the embodiment described above, the second sign is disposed on the rear surface 12a of the second holding part 12 along the radial direction of the cylinder 20. Therefore, the user can easily regulate the levelness of the head shell main body 10 by visually observing the head shell 1 from the rear.

In addition, according to the embodiment described above, the second sign is a long groove extending along the radial direction. Therefore, the user can easily regulate the levelness of the head shell main body 10 by visual observation by rotating the head shell main body 10 to set the center line 121x of the second sign to the central axis 22x of the projection part 22.

As described above, in the head shell 1, rotation of the head shell main body 10 is restricted with the distal end part 51 disposed inside the screw guide groove 23b. In addition, in the head shell 1, the user can regulate the levelness of the head shell main body 10 by checking the position of the regulating groove 121 with respect to the projection part 22 by visual observation. As a result, the head shell 1 enables easy regulation of overhang.

In addition, as described above, the regulating groove 121 is a groove extending along the up-down direction, and the screw guide groove 23b is a groove extending along the front-rear direction. The regulating groove 121 and the screw guide groove 23b are disposed on the external surfaces (the rear surface 12a and the external circumferential surface 23a) of the head shell 1 that are visually observed by the user. Specifically, the regulating groove 121 and the screw guide groove 23b appear in the external appearance of the head shell 1, as the two grooves alternating in the up-down direction and the front-rear direction. As a result, the head shell 1 gives a prospective consumer of the head shell 1 to have an aesthetic impression different from that of the conventional head shell.

It should be noted that the screw guide groove is disposed along the axial direction, and may not disposed at the front end and the rear end of the main body holding part. Specifically, for example, the screw guide groove may be formed with a length approximately half the length of the main body holding part in the axial direction. In this case, in the state in which each of the first fixing screw and the second fixing screw is unfastened, falling of the head shell main body from the cylinder can be prevented.

In addition, in axial view, the circumferential length of the screw guide groove may be equal to or smaller than the external diameter of the first fixing screw.

In addition, in axial view, the circumferential length of the screw guide groove may be larger than the external diameter of the first fixing screw. In this case, for example, even when the distal end part of the first fixing screw includes a complete thread part, the head shell main body is movable only in substantially the axial direction without rotating in a large angle range with respect to the cylinder.

In addition, when the first fixing screw is fastened, the distal end surface of the first fixing screw may not abut against the bottom surface of the screw guide groove. In other words, when the head shell main body is fixed to the cylinder with the first fixing screw, the first fixing screw may abut against the screw guide groove in the circumferential direction. In this case, for example, the spaces are defined when the first fixing screw is unfastened. After regulation of the levelness of the head shell main body, the first fixing screw is fastened to a degree to prevent the head shell main body from moving in the circumferential direction with respect to the cylinder.

In addition, the distal end of the first fixing screw is not limited to a head flat point type. Specifically, for example, the first fixing screw may be a set screw having a various distal end shape, such as a cone point, a round point, a cup point, and a dog point.

In addition, the material of each of the first fixing screw and the second fixing screw is not limited to that of the present embodiment.

In addition, the first fixing screw is not limited to a set screw. Specifically, for example, the first fixing screw may be a bolt including a head part.

In addition, disposition of the first screw hole is not limited to the present embodiment. Specifically, for example, the first screw hole may be disposed in the left side surface or the upper surface of the second holding part. In this case, the screw guide groove is disposed at a position opposed to the first screw hole in the external circumferential surface of the cylinder when the cylinder is inserted through the insertion hole.

In addition, the first sign is not limited to the projection part. Specifically, for example, the terminal pins may function as the first sign. In this case, for example, the user regulates the levelness of the head shell main body by using positional relation between the four terminal pins and the regulating groove as a criterion.

In addition, a groove functioning as the first sign, or a figure or a mark, such as a circle, a polygon, a star-shape, and an arrow, may be disposed on the rear surface of the insulating member. In this case, the cylinder may include the insulating member.

In addition, when the head shell includes no buffer member (or when the buffer member is detached), a groove, a figure, or a mark functioning as the first sign may be disposed on the rear surface of the main body holding part.

In addition, a groove or a recessed part functioning as the first sign may be disposed on the external circumferential surface of the cylinder. Specifically, for example, a long groove having the same width as that of the regulating groove may be disposed on the external circumferential surface of the cylinder along the axial direction. In this case, for example, the user regulates the levelness of the head shell main body while observing the head shell from above.

In addition, the second sign is not limited to the shape extending along the radial direction as long as the second sign serves as a landmark for regulation in the circumferential direction with respect to the first sign. Specifically, for example, the second sign may be a figure or a mark.

In addition, a projecting part functioning as the second sign may be disposed on the rear surface of the second holding part.

In addition, the second sign may not include a recessed part or a projecting part in the rear surface of the second holding part. Specifically, for example, the second sign may be a paint applied to the rear surface, or a sticker put on the rear surface. As another example, the slit of the second holding part may function as the second sign.

In addition, the number of second sign is not limited to one. For example, the second sign may be a plurality of graduations arranged in the circumferential direction.

In addition, the second sign may be disposed on the upper surface of the second holding part. In this case, for example, the user regulates the levelness of the head shell main body while observing the head shell from above.

In addition, the second sign may be disposed on the right side surface of the second holding part. In this case, the screw guide groove functions as the first sign.

In addition, the first sign and the second sign only need to be disposed in line in the radial direction in axial view. Specifically, for example, the first sign and the second sign may be capable of being disposed in line in the right-and-left direction.

In addition, each of the first sign and the second sign may include a straight recessed part or projecting part extending along the front-rear direction in top view. Specifically, for example, the first sign may be disposed in the center of the upper surface of the second holding part in the right-left direction, and the second sign may be disposed on the upper end surface of the holding part.

In addition, the embodiment described above does not improperly limit the details of the inventions recited in the claims. In addition, all the structures explained in the embodiment described above are not always indispensable constituent elements of the present disclosure.

The invention claimed is:

1. A head shell attachable to and detachable from a connector of a tone arm of a record player, and holding a pickup cartridge, the head shell comprising:
   a cylinder attachable to and detachable from the connector;
   a head shell main body held to the cylinder;
   a fixing screw capable of fixing the head shell main body to the cylinder; and
   a regulation assistance mechanism configured to assist regulation of a position of the head shell main body with respect to the cylinder in the circumferential direction, wherein
   the cylinder includes:
      a cylindrical cylinder external circumferential surface; and
      a groove disposed on the cylinder external circumferential surface along an axial direction of the cylinder,
   a part of the fixing screw is disposed inside the groove, and
   a space is defined between the fixing screw and the groove in a circumferential direction of the cylinder, and
   the regulation assistance mechanism includes:
      a first sign; and
      a second sign movable with respect to the first sign,
   the cylinder includes the first sign, and
   the head shell main body includes the second sign.

2. The head shell according to claim 1, wherein
   the head shell main body is rotatable in the circumferential direction with respect to the cylinder, and
   a range of the rotation is restricted by abutment of the fixing screw against the groove.

3. The head shell according to claim 1, wherein
   the fixing screw includes a distal end surface, and
   the distal end surface can abut against a bottom surface of the groove.

4. The head shell according to claim 1, wherein
   the head shell main body includes an insertion hole through which the cylinder is inserted and in which a part of the cylinder is disposed, and
   the fixing screw projects into the insertion hole.

5. The head shell according to claim 1, wherein
   the cylinder includes a holding part that holds the head shell main body, and
   the holding part includes the cylinder external circumferential surface.

6. The head shell according to claim 1, wherein
   the fixing screw includes a distal end part disposed inside the groove, and
   the space is defined between the distal end part and the groove in the circumferential direction.

7. The head shell according to claim 6, wherein the distal end part includes a chamfered surface that is chamfered.

8. The head shell according to claim 1, wherein the head shell main body is slidable in the axial direction of the cylinder by guiding of the fixing screw to the groove.

9. The head shell according to claim 1, wherein the first sign and the second sign can be disposed in line in a radial direction of the cylinder in axial view of the cylinder.

10. The head shell according to claim 1, wherein
    the cylinder includes:
       a connector part attachable to and detachable from the connector; and
       a projection part capable of fixing the connector part to the connector, and
    the projection part functions as the first sign.

11. The head shell according to claim 10, wherein
    the connector part includes a cylindrical connector external circumferential surface, and
    the projection part projects from the connector external circumferential surface in a radial direction of the connector part.

12. The head shell according to claim 10, wherein
    the head shell main body includes a back surface facing the tone arm side when the cylinder is attached to the connector, and
    the second sign is disposed on the back surface.

13. The head shell according to claim 12, wherein
    the cylinder penetrates the back surface, and
    the second sign extends along a radial direction of the cylinder.

14. The head shell according to claim 12, wherein
    the back surface includes a recessed part or a projecting part, and
    the recessed part or the projecting part functions as the second sign.

15. The head shell according to claim 14, wherein the recessed part is a long groove extending along a radial direction of the cylinder.

* * * * *